April 14, 1970 J. M. BEVIS 3,506,910

TEMPERATURE INDEPENDENT CONSTANT CURRENT SUPPLY

Filed July 17, 1967

INVENTOR.
JEFFREY M. BEVIS

BY Julius L. Rubinstein

ATTORNEY

United States Patent Office 3,506,910

Patented Apr. 14, 1970

3,506,910
TEMPERATURE INDEPENDENT CONSTANT CURRENT SUPPLY

Jeffrey M. Bevis, Long Beach, Calif., assignor to Chalco Engineering Corporation, Gardena, Calif.

Filed July 17, 1967, Ser. No. 653,775
Int. Cl. G05f *1/44*
U.S. Cl. 323—4 8 Claims

ABSTRACT OF THE DISCLOSURE

A transistorized on-off constant current supply. One current path allows load current bulidup to a predetermined value at which value a switching transistor is turned off. A second current path turns the switching transistor on when load current falls below the predetermined value. The supply is temperature independent while a snap-action effect minimizes power dissipation.

This invention relates generally to a current supply and more particularly to a constant current supply which is substantially independent of temperature and which has a low power loss.

This invention utilizes a switching power transistor in series with a metering resistor, an inductance coil, and a load in a two current path circuit. In one path, current flows through the switching power transistor and on through the metering resistor, inductance coil and load. The effect of the inductance is to cause a gradual current buildup until the voltage drop across the metering resistor reaches a predetermined value (in this embodiment .5 volt). When this happens, a silicon control transistor is turned on (becomes conductive). This control transistor is connected by appropriate circuitry to the switching power transistor and causes the switching power transistor to turn off (become nonconductive) when the control transistor becomes conductive, and vice versa.

When this happens the electromagnetic energy in the inductance coil is dissipated in the form of electric current which flows through the load, the metering resistor, and the inductance coil in the second current path. In this way the current flow to the load is maintained during the period of time that the switching power transistor is nonconductive.

However, the electric current generated by the inductance coil which flows through the second path gradually decays. Consequently, when the voltage drop across the metering resistor decreases below the above-mentioned one-half volt, the control transistor turns off and the switching power transistor turns on again. This arrangement provides an essentially constant current flow through the load.

The silicon control transistor has a base offset voltage of .7 volt. However, the base offset voltage is also a function of temperature, so that unless measures are taken, the constant current supply would be affected by temperature. To remedy this, a germanium diode is connected in the control transistor circuit to provide a reference .2 voltage. This voltage is added to the .5-volt drop across the metering resistor to provide a low voltage reference. Since the temperature coefficient of the germanium diode is substantially the same as that of the silicon control transistor, changes in temperature cause a change in the base offset voltage of the silicon control transistor which is substantially the same as the voltage drop across the germanium diode. Consequently, the voltage drop across the metering resistor required to turn the silicon control transistor and hence the constant current supply is, for all practical purposes, unaffected by temperature.

To reduce power dissipation, the switching power transistor must be either completely on or completely off. This is achieved by the use of a small feedback resistor in series with the current control diode. This arrangement provides a positive feedback in the second current path which provides a snap-action for the power transistor. In this way, the switching power transistor is always completely on or completely off and power dissipation is avoided.

BRIEF SUMMARY

Constant current supply circuits heretofore used had a number of problems. For one thing, if they were simple in design, they had a high power loss. In many environments, the heat generated by the high power loss created problems. On the other hand, if the circumstances required a low power loss and low heat generation, this could heretofore be done only at the cost of using a more complicated circuit.

In addition, prior constant current supplies, if simple in design, were sensitive to temperature, and if it was necessary that the constant current supply not be sensitive to temperature, this was heretofore done at the cost of using a still more complicated circuit.

This invention solves both problems in a simple way through the use of a germanium diode and a small resistor in the base circuit of the control transistor. The temperature coefficient of the germanium diode is very nearly the same as the temperature coefficeint of a silicon control transistor in the circuit of the current supply. Consequently, by suitably connecting the germanium diode in the base circuit of the silicon control transistor, temperature changes which affect the base offset voltage of the silicon control transistor would effect the voltage drop across the germanium diode just enough to substantially compensate for the temperature change in the base offset voltage.

In addition, the low voltage drop across the germanium diode permits a much smaller metering resistor to be used in the circuit of the constant current supply than would otherwise be possible. Consequently, the constant current supply circuit is simpler to construct. Furthermore, the small resistance in series with the germanium diode provides a base circuit of the silicon control transistor with a snap-action which has the effect of substantially eliminating power loss in the circuit.

What is needed therefore, and comprises an important object of this invention, is to provide a constant current supply which is simple to construct, yet is temperature compensated and which has a low power loss.

This and other objects of this invention will become more apparent when better understood in the light of the accompanying drawings and specification, wherein.

Figure 1:
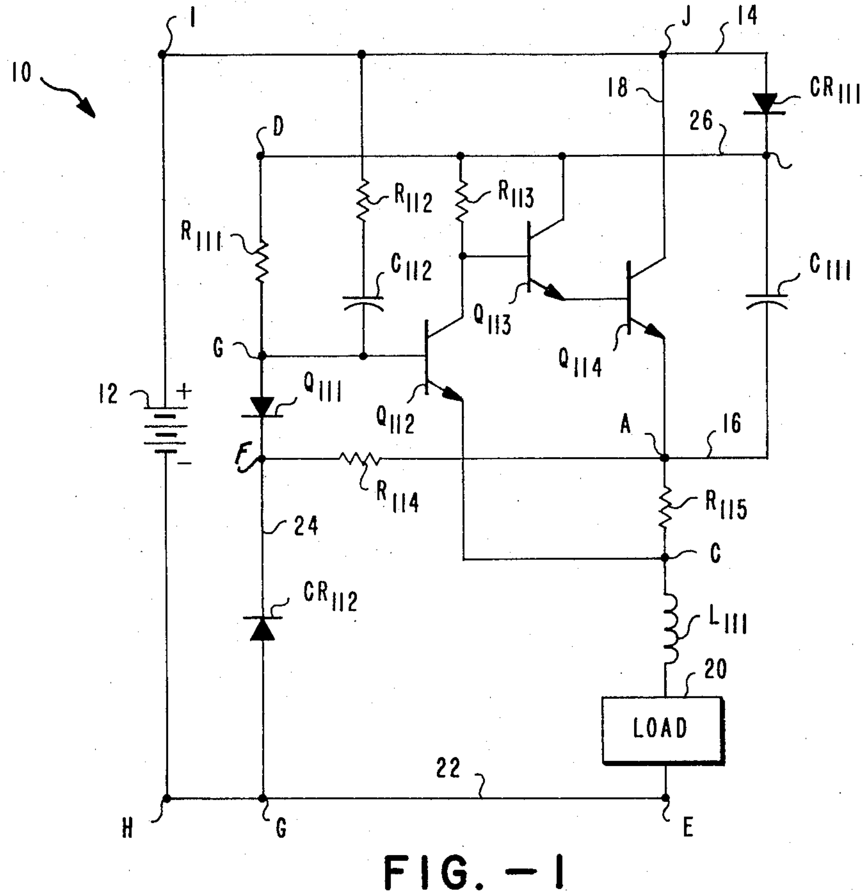
FIGURE 1 is a circuit diagram of the constant current supply.

Referring now to FIGURE 1 of the drawing, a circuit diagram indicated generally by the reference numeral 10 comprise (in this particular embodiment) a 28-volt battery or voltage source 12. The positive side of the battery is connected through line 14 to one side of a charging diode $CR_{111}$. The opposite side of diode $CR_{111}$ is connected to a terminal at one side of a capacitor $C_{111}$. The opposite side of capcitor $C_{111}$ is connected to terminal A through line 16. The collector of an NPN switching power transistor $Q_{114}$ in line 18 is connected to line 14, and its emitter is connected to line 16 at terminal A. A .25-ohm metering resistor $R_{115}$ in line 18 is connected betweetn terminals A and C. A large (85 m.h.) inductance $L_{111}$ in series with the load 20 is connected between terminal C in line 18 and terminal E in line 22. This line is connected to the negative side of the battery or voltage supply 12.

A commutating or current controlling diode $CR_{112}$ is in line 24 connected between lines 16 and 22. In addition, a biasing resistor $R_{111}$ and a germanium diode $Q_{111}$ are connected between terminals D and F in line 24.

One side of the germanium diode at terminal G is connected to the base of an NPN silicon control transistor $Q_{112}$. The emitter of transistor $Q_{112}$ is connected to terminal C in line 18 and its collector is connected to the bias voltage power line 26 through a voltage dropping resistor $R_{113}$.

The collector of control transistor $Q_{112}$ is connected to the base of the NPN amplifying transistor $Q_{113}$. The collector of transistor $Q_{113}$ is connected to line 26 while its emitter is connected to the base of switching power transistor $Q_{114}$ to provide base current to that transistor. A .01-ohm feedback resistor $R_{144}$ is in line 16 between terminals A and F for reasons to be described below.

A study of circuit 10 shows that when transistor $Q_{114}$ is open (nonconductive) the potential at terminal A and the connected side of capacitor $C_{111}$ is at zero or the negative side of battery 12. This is due to the effect of the current controlling diode $CR_{112}$. Meanwhile, the effect of the charging diode $CR_{111}$ is to cause the potential at the opposite side of the capacitor $C_{111}$ to be at 28 volts.

On the other hand, when the transistor $Q_{114}$ is closed (conductive), the potential at terminal A rises to the potential at the positive side of the battery 12, or in this case to 28 volts. Meanwhile, the potential at line 26, due to the voltage already across the capacitor, rises to around 56 volts. Hence, the voltage across the capacitor is maintained at about 28 volts regardless of whether transistor $Q_{114}$ is open or closed. This voltage on the bias voltage power line 26 provides a biasing voltage or turn-on voltage for the transistors $Q_{112}$ and $Q_{113}$. Consequently in effect, capacitor $C_{111}$ functions as a very simple voltage supply which never runs down, and the biasing voltage required for the control transistors does not require auxilliary equipment for its functioning.

If transistor $Q_{114}$ is initially closed, current will flow through line 18 and in the first path around terminal points I, J, E, H. Because of the effect of the inductance $L_{111}$, the current in the first path will gradually increase in magnitude. However, before the current approaches its theoretical limit, the circuit constants are selected so the voltage drop across the .25-ohm metering resistor $R_{115}$ will have reached a .5 volt (for this particular circuit). As shown in the drawings, terminal C is connected to the emitter of the control transistor $Q_{112}$. This transistor has a base offset voltage of .7 volt, so in order for this transistor to turn on (become conductive) the base of transistor $Q_{112}$ must be .7 volt higher than the emitter potential. The additional .2 volt required is provided by the germanium diode $Q_{111}$ which is connected to terminal A through line 16 and is in series with the .01-ohm resistor $R_{114}$.

Consequently, as soon as the current flow through line 18 rises enough to provide a .5 volt drop across the resistance $R_{115}$, then transistor $Q_{112}$ turns on (becomes conductive).

When this happens, the current flow to biasing resistor $R_{113}$ causes a voltage drop on the base of the NPN amplifying transistor $Q_{113}$ which turns it off. This in turn cuts off the flow of current to the base of transistor $Q_{114}$ causing that transistor to shut off (become non-conductive). When this happens, current no longer flows through the first path I, J, E, H. However, the electro-magnetic energy stored in the inductance coil $L_{111}$ causes that inductance coil to act as a current generator and causes current to flow in the second current path A, E, G, F. However, since there is only a limited amount of electro-magnetic energy in the inductance coil $L_{111}$, the magnitude of the current in the second current path will start to decay and the voltage drop across the metering resistor $R_{115}$ will gradually fall. As soon as this voltage drop decreases below .5 volt, the base to emitter voltage of transistor $Q_{112}$ will be insufficient to keep that transistor conductive, so it turns off (becomes nonconductive).

When transistor $Q_{112}$ turns off (becomes nonconductive), the current flow through resistor $R_{113}$ decreases so that the potential on the base of the amplifying transistor $Q_{113}$ rises. This causes transistor $Q_{113}$ to turn on (become conductive). This in turn increases the current to the base of the switching power transistor $Q_{114}$ causing it to become conductive. Then current again starts to flow in line 18 in the first current path I, J, E, H and the cycle is repeated.

Figure 2:
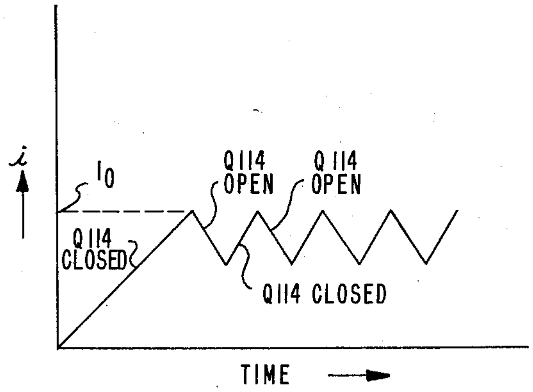
FIGURE 2 is a diagram showing the current buildup in the inductance coil and the load as a function of time.

The behavior of the current as a function of time can be seen in FIGURE 2. It is apparent that when $Q_{114}$ is closed, the current in line 18 and through load 20 increases with time until the current reaches a value $I_0$ (here two amps) which is sufficient to cause the .5-volt drop across resistance $R_{115}$. When this happens, transistor $Q_{114}$ opens and the current then flows in the second current path A, E, G, F. However, this current decays until, as explained above, transistor $Q_{114}$ turns on again to repeat the cycle.

The result is a current through load 20 and the metering resistor $R_{115}$ and inductance coil $L_{111}$ which is essentially constant except for a small ripple. The peak to peak ripple amplitude is determined by the value of feed back resistor $R_{114}$. The ratio of the peak to peak amplitude to average current level is equal to the ratio of the resistance $R_{114}$ to the resistance $$R_{115}\left(\frac{.01}{.25}=4\%\right)$$

The ripple wave is triangular and the slope of the triangular side is a function of the inductance $L_{111}$ and the applied voltage. Ripple frequency is therefore dependent on the ripple amplitude and is of the order of 500 Hz.

As stated above, however, for many applications it is necessary for the current supply to be independent of temperature. Since the base to emitter offset voltage of transistor $Q_{112}$ is a function of temperature, it would appear that the above-described current supply would also be affected by temperature. However, the use of the germanium diode in lines 24 and 16, in addition to supplying the desirable low reference voltage, also supplies temperature compensation. This is because the temperature coefficient of the germanium diode is substantially the same as that of the silicon transistor. Consequently, any change in the base offset voltage of the silicon transistor $Q_{112}$ is compensated for by corresponding changes in the voltage across the germanium diode. Furthermore, the low reference voltage of the germanium diode makes possible a more simple control circuit with a lower power loss because of the low magnitude of the control voltages required.

In many applications it is important that the current supply have a low power dissipation, as when heat dissipation is objectionable. Referring to the switching power transistor $Q_{114}$, it is clear that when that transistor is off the voltage across the transistor is greatest, but the current flow through the transistor is zero, so in that situation there is no power loss. Similarly, when the transistor is conductive, the current flow through the transistor is large, but the voltage drop across the transistor is negligible. Consequently, in this condition power loss is also negligible. For this reason low power operation of a constant current supply requires that transistor $Q_{114}$ be either completely on or completely off. Operation of transistor $Q_{114}$ during a partially conductive state must be avoided.

To provide this, the .01-ohm resistor $R_{114}$ is inserted in line 16 between the germanium diode and terminal A to introduce a positive feedback which provides a snap-action for the switching circuit.

If resistor $R_{114}$ were omitted, it is clear that as soon as the potential at terminal C was ½ volt greater than the potential at terminal A, transistor $Q_{112}$ would be only partially turned on. This is because as soon as transistor $Q_{112}$ would start to turn on a little, transistor $Q_{114}$ would start to turn off a little. This, in turn would prevent the voltage at terminal C from geting higher. However, this would cause operation of the switching power transistor $Q_{114}$ during periods when it was only partially conductive, so that in this situation there would be a substantial power loss and high heat dissipation.

However, the effect of resistor $R_{114}$ is such that as soon as the voltage drop across the metering resistor $R_{115}$ reaches ½ volt, causing transistors $Q_{112}$ and $Q_{114}$ to start to turn on and off respectively, a current flow starts in the second path A, E, G, F. This would increase the base to emitter voltage of transistor $Q_{112}$ giving it a 20 millivolt push up which causes it to suddenly turn completely on and causes transistor $Q_{114}$ to suddenly turn completely off in a snap-action.

Similarly, when the current in path A, E, G, F starts to decay, transistor $Q_{112}$ starts to turn off. When this happens, current flow through the resistor $R_{114}$ stops providing a 20-millivolt push downward which causes transistor $Q_{114}$ to turn completely off in a snap-action effect. The transistor $Q_{114}$ is thus either completely on or completely off and power dissipation and heat generation in the circuit 10 is minimized.

Resistance $R_{112}$ and capacitor $C_{112}$ connected between line 14 and the base of transistor $Q_{112}$ speeds up the transition in the transistor $Q_{114}$.

Obviously, many modifications and variations of the present invention are possible in the light of the above teachings. It is therefore to be understood that the invention can be practised otherwise than as specifically described.

What is claimed is:

1. A constant current supply of the class described comprising a circuit having a first current path and a second current path, a switching transistor in said first current path, said switching resistor in series with a metering resistor, an inductance coil and a load, said metering resistor, said inductance coil and said load in both said first and said second current paths to provide a constant current supply through said load, a voltage source for causing current to flow through said switching transistor, metering resistor, inductance coil and load, when said switching transistor is conductive whereby said inductance coil is charged, electrical elements in said circuit for providing a built in reference voltage for establishing the level of current flow through said load, a control transistor connected to said metering resistor in such a way that said control transistor becomes conductive when said current flow through said resistor reaches a predetermined level, means connected between said control transistor and said switching transistor for causing said switching transistor to become nonconductive when said control transistor becomes conductive, whereby the magnetic energy in said inductance coil causes said inductance coil to function as a current generator to cause current to flow through said load and said current path, said current flow in said second path continuing until the magnitude of the current in said second current path falls below said predetermined level whereby said control transistor becomes nonconductive and said switching transistor becomes conductive and means in said circuit for causing the operation of the control transistor to be independent of temperature, whereby the constant current supply is not affected by changes in temperature.

2. The constant current supply described in claim 1 wherein said control transistor is a silicon transistor, and said means for causing said control transistor to be independent of temperature includes a germanium diode in the base cricuit of said control transistor.

3. A constant current supply of the class described comprising a circuit having a first current path and a second current path, a switching transistor in said first current path, said switching transistor in series with a metering resistor, an inductance coil and a load, said metering resistor, said inductance coil, and said load in both said first and said second current paths to provide a constant current supply through said load, a voltage source for causing current to flow through said switching transistor, metering resistor, inductance coil and load when said switching transistor is conductive whereby said inductance coil is charged, electrical elements in said circuit for providing a built-in reference voltage for establishing the level of current flow through said load, a control transistor connected to said metering resistor in such a way that said control transistor becomes conductive when said current flow through said resistor reaches a predetermined level, means connected between said control transistor and said switching transistor for causing said switching transistor to become nonconductive when said control transistor becomes conductive, whereby the magnetic energy in said inductance coil causes said inductance coil to function as a current generator to cause current to flow through said load and said second current path, said current flow in said second current path continuing until the magnitude of the current in said second path falls below said predetermined level, and a single electrical element in said second current path, for causing said switching transistor to operate either completely on or completely off whereby power dissipation and heat generation in said constant current supply is minimized.

4. The constant current supply described in claim 3 wherein said single electrical element for causing said switching transistor to operate either completely on or completely off comprises positive feedback means in the second circuit path, said positive feedback means connected to the base circuit of said control transistor in such a way as to add or subtract voltage to the base emitter voltage of the control transistor each time the control transistor changes from its conductive state to its nonconductive state for causing said control transistor to turn completely on or completely off in a snap-action.

5. The constant current supply described in claim 4 wherein said positive feedback means comprises a simple resistor connected between the germanium diode and one side of the metering resistor.

6. A constant current supply of the class described, comprising a circuit having a first current path and a second current path, a voltage source and a switching transistor in said first current path with the collector of said switching transistor connected to the positive side of said voltage source, a metering resistor, an inductance coil and a load in series with each other, and in both first and second current paths, the emitter of a switching transistor connected to the high voltage side of the metering resistor whereby whenever current flows in either said first current path or said second current path, current flows through said load, said second current path, including a current control diode and a feedback resistor with said feedback resistor connected to the high voltage side of said metering resistor, a silicon control transistor, the emitter of said silicon control transistor connected to the low voltage side of said metering resistor, a source of bias voltage, the collector of said control transistor connected to said source of bias voltage through a biasing resistor, circuit means connected between the collector of the control transistor and the base of said switching transistor and operating so that when said control transistor becomes conductive, said switching transistor becomes nonconductive, and when said control transistor becomes nonconductive, said switching transistor becomes conductive, a biasing resistor and a germanium diode connected in series and between said source of bias voltage and one side of said feedback resistor, said metering resistor selected so that when the current flow through said switching transistor reaches a magnitude sufficient to cause a .5-volt drop across the metering resistor, the germanium diode provides a .2 voltage drop, which is added to the .5-volt drop across the metering resistor to cause the control transistor to become conductive and said switching transistor to become nonconductive, whereby the germanium diode provides both a low reference control voltage and temperature compensation for the silicon control transistor, so that the constant current supply will be independent of temperature, said inductance coil serving to absorb magnetic energy when said switching transistor is conductive and current is flowing through said load in said first current path, and serving as a current generator when said switching transistor becomes nonconductive, causing the current to flow through said load around said second current path, until said current decays sufficiently so that the control transistor becomes nonconductive and said switching transistor becomes conductive causing current to flow back around said first path and through said load, said feedback resistor in the second path functioning to provide a snap-action to said silicon control transistor and said switching transistor, whereby said switching transistor will operate completely on or completely off, whereby power loss to said switching transistor is minimized.

7. The constant current supply described in claim 6 wherein said bias voltage source is provided by a charging diode in series with a capacitor, one side of a charging diode connected to the positive side of said voltage source, one side of the capacitor connected to the emitter of said switching transistor, said one side of said capacitor also connected to the negative side of said battery through said current control diode, whereby the voltage across the capacitor is maintained substantially equal to the magnitude of the voltage source regardless of whether the switching transistor is conductive or nonconductive so that the capacitor functions as a source of biasing voltage.

8. The constant current supply described in claim 7 wherein said means connected between the collector of said control transistor and the base of said switching transistor comprises a low power amplifying transistor, the base of said amplifying transistor connected to the collector of the control transistor, the emitter of said amplifying transistor connected to the base of said switching transistor, the collector of said amplifying transistor connected to said bias voltage source.

References Cited

UNITED STATES PATENTS

| | | |
|---|---|---|
| 3,323,038 | 5/1967 | Greenberg et al. |
| 3,237,088 | 2/1966 | Karp et al. |

LEE T. HIX, Primary Examiner

A. D. PELLINEN, Assistant Examiner

U.S. Cl. X.R.

323—38